(12) United States Patent
Iwanaga et al.

(10) Patent No.: US 12,461,542 B2
(45) Date of Patent: Nov. 4, 2025

(54) SYSTEM, METHOD, AND WORK VEHICLE

(71) Applicant: KOMATSU LTD., Tokyo (JP)

(72) Inventors: Yoshihiro Iwanaga, Tokyo (JP); Takahiro Noyori, Tokyo (JP)

(73) Assignee: KOMATSU LTD., Tokyo (JP)

( * ) Notice: Subject to any disclaimer, the term of this patent is extended or adjusted under 35 U.S.C. 154(b) by 158 days.

(21) Appl. No.: 18/548,800

(22) PCT Filed: Feb. 24, 2022

(86) PCT No.: PCT/JP2022/007611
§ 371 (c)(1),
(2) Date: Sep. 1, 2023

(87) PCT Pub. No.: WO2022/209465
PCT Pub. Date: Oct. 6, 2022

(65) Prior Publication Data
US 2024/0152155 A1    May 9, 2024

(30) Foreign Application Priority Data
Mar. 31, 2021 (JP) ................. 2021-061381

(51) Int. Cl.
*G05D 1/229* (2024.01)
*G05D 1/622* (2024.01)
(Continued)

(52) U.S. Cl.
CPC .......... *G05D 1/2295* (2024.01); *G05D 1/622* (2024.01); *G05D 2105/05* (2024.01); *G05D 2107/20* (2024.01)

(58) Field of Classification Search
CPC .. G05D 1/2295; G05D 1/622; G05D 2107/20; G05D 2105/05
See application file for complete search history.

(56) References Cited

U.S. PATENT DOCUMENTS

2010/0076640 A1    3/2010  Maekawa et al.
2019/0004524 A1*   1/2019  Wang ................. B60W 60/001
(Continued)

FOREIGN PATENT DOCUMENTS

CN    111796588 A    10/2020
JP    2010-73080 A    4/2010
(Continued)

OTHER PUBLICATIONS

Li Xiaohui et al.: "Real-Time Trajectory Planning for Autonomous Urban Driving: Framework, Algorithms, and Verifications", IEEE/ASME Transactions on Mechatronics, vol. 21, No. 2, Apr. 2016, pp. 740-753, IEEE Service Center, Piscataway, NJ.

*Primary Examiner* — Michael D Lang
(74) *Attorney, Agent, or Firm* — GLOBAL IP COUNSELORS, LLP

(57) ABSTRACT

A system searches for a track for a vehicle to travel automatically. The system includes a processor. The processor includes a route search unit, a restriction condition generation unit, and a track search unit. The route search unit searches for a series having elements of a position and posture of the vehicle, which is a route for moving from an initial position to a target position of the vehicle, based on a first restriction condition representing a position of an obstacle. The restriction condition generation unit generates a second restriction condition in which a penalty value increases according to a deviation distance from the route. The track search unit searches for a series having elements of a position, posture, speed, and steering angle of the vehicle, which is a track for moving from the initial position to the target position of the vehicle, based on the second restriction condition.

9 Claims, 9 Drawing Sheets

(51) Int. Cl.
*G05D 105/05* (2024.01)
*G05D 107/20* (2024.01)

(56) References Cited

U.S. PATENT DOCUMENTS

| | | |
|---|---|---|
| 2019/0086925 A1 | 3/2019 | Fan et al. |
| 2020/0149906 A1 | 5/2020 | Tu et al. |
| 2021/0065060 A1 | 3/2021 | Minoya |

FOREIGN PATENT DOCUMENTS

| | | |
|---|---|---|
| JP | 2020-534621 A | 11/2020 |
| JP | 2021-33685 A | 3/2021 |
| WO | 2019/060679 A1 | 3/2019 |

\* cited by examiner

SYSTEM, METHOD, AND WORK VEHICLE

CROSS-REFERENCE TO RELATED APPLICATIONS

This application is a U.S. National stage application of International Application No. PCT/JP2022/007611, filed on Feb. 24, 2022. This U.S. National stage application claims priority under 35 U.S.C. § 119(a) to Japanese Patent Application No. 2021-061381, filed in Japan on Mar. 31, 2021, the entire contents of which are hereby incorporated herein by reference.

BACKGROUND

Field of the Invention

The present disclosure relates to a system, a method, and a work vehicle.

Priority is claimed on Japanese Patent Application No. 2021-061381, filed on Mar. 31, 2021, the content of which is incorporated herein by reference.

Background Information

At a work site such as a crushing site or a mine, an automatic driving system for a work vehicle may be introduced. The automatic driving system calculates a track for the work vehicle to reach a target position, and causes the work vehicle to travel based on the track. Japanese Unexamined Patent Application, First Publication No. 2010-073080 discloses a technique related to a method of generating a traveling route of an unmanned vehicle.

SUMMARY

Track calculation for a vehicle to travel automatically is an optimization problem. Additionally, in the track calculation, an obstacle present at a work site is given as a restriction condition. However, a mathematical model used to search for a track is represented by multi-dimensional vectors such as a position, posture, steering angle, speed, and acceleration of a vehicle, and a position and shape of obstacles are not necessarily simple, and nonlinearity of the restriction condition may be high. For this reason, it is difficult to calculate a traveling track of the vehicle on-line because the calculation of the track increases an amount of calculation or converges to a local solution. Meanwhile, when the number of dimensions of a model is reduced in order to reduce the amount of calculation, there is a possibility that operations related to the reduced dimensions may be discontinuous in an obtained track.

An object of the present disclosure is to provide a track search device and a track search method capable of obtaining a continuous track with a small amount of calculation.

According to a first aspect of the present invention, there is provided a system searching for a track for a vehicle to travel automatically includes a processor. The processor includes a route search unit configured to search for a series having elements of a position and posture of the vehicle, which is a route for moving from an initial position to a target position of the vehicle, based on a first restriction condition representing a position of an obstacle, a restriction condition generation unit configured to generate a second restriction condition in which a penalty value increases according to a deviation distance from the route, and a track search unit configured to search for a series having elements of a position, posture, speed, and steering angle of the vehicle, which is a track for moving from the initial position to the target position of the vehicle, based on the second restriction condition.

According to a second aspect of the present invention, there is provided a method of searching for a track for a vehicle to travel automatically. The method includes the following processes. In a first process, a series having elements of a position and posture of the vehicle, which is a route for moving from an initial position to a target position of the vehicle, is searched for based on a first restriction condition representing a position of an obstacle. In a second process, a second restriction condition is generated, in which a penalty value increases according to a deviation distance from the route. In a third process, a series having elements of a position, posture, speed, and steering angle of the vehicle, which is a track for moving from the initial position to the target position of the vehicle, is searched for based on the second restriction condition.

According to a third aspect of the present invention, there is provided a work vehicle including: a vehicle body; a traveling device for causing the vehicle body to travel; and a processor. The processor includes a route search unit configured to search for a series having elements of a position and posture of the work vehicle, which is a route for moving from an initial position to a target position of the work vehicle, based on a first restriction condition representing a position of an obstacle, a restriction condition generation unit configured to generate a second restriction condition in which a penalty value increases according to a deviation distance from the route, a track search unit configured to search for a series having elements of a position, posture, speed, and steering angle of the work vehicle, which is a track for moving from the initial position to the target position of the work vehicle, based on the second restriction condition, and a traveling control unit configured to control the traveling device according to the track.

According to at least one of the above aspects, the track search device can obtain a continuous track with a small amount of calculation.

DETAILED DESCRIPTION OF EMBODIMENT(S)

First Embodiment

Configuration of Work Vehicle

Hereinafter, embodiments will be described in detail with reference to the drawings.

Figure 1:
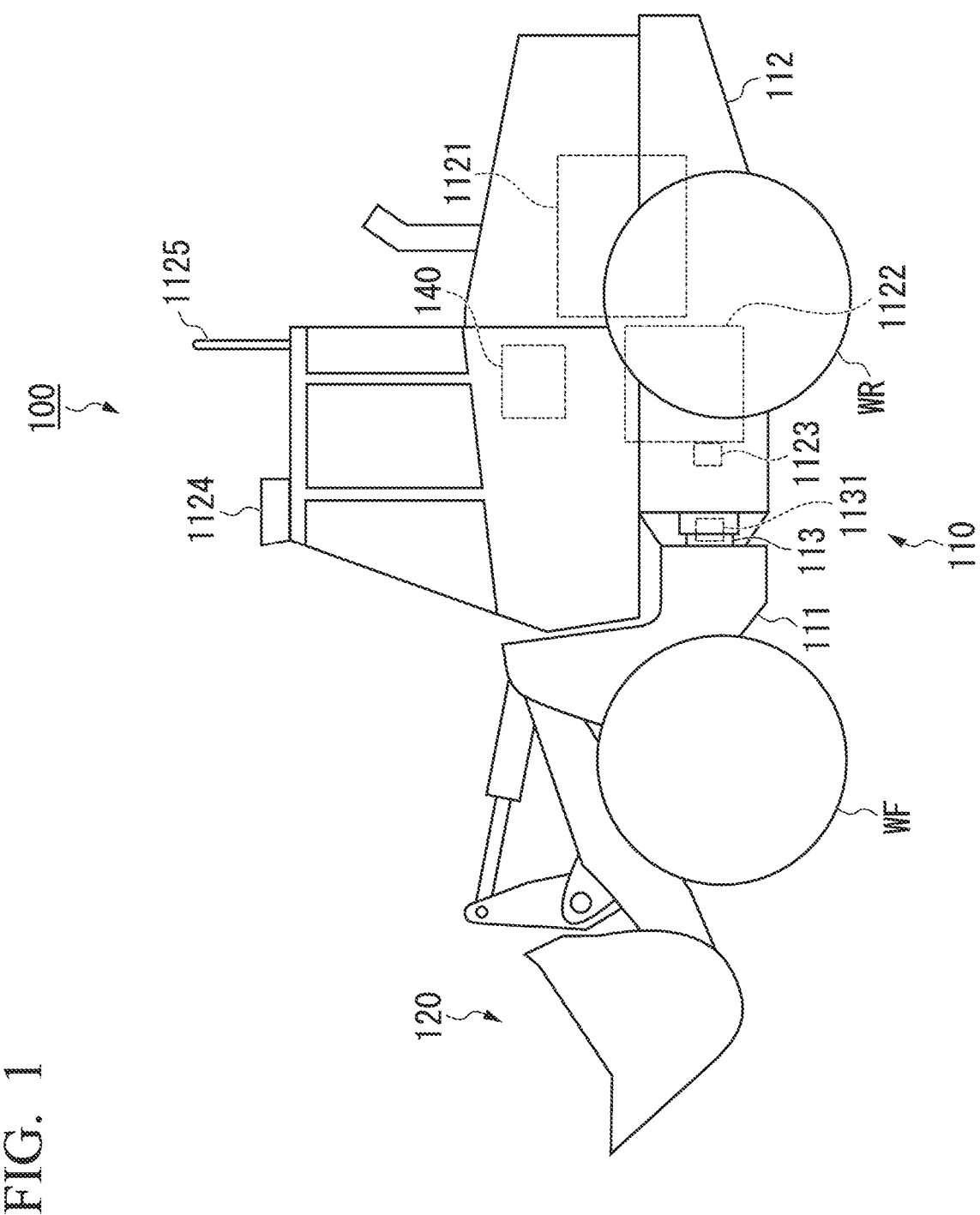
FIG. 1 is a side view of a work vehicle according to a first embodiment.

FIG. 1 is a side view of a work vehicle according to a first embodiment.

A work vehicle 100 according to the first embodiment is a wheel loader. The work vehicle 100 is driven by automatic operation. That is, the work vehicle 100 is an unmanned traveling vehicle. The work vehicle 100 includes a vehicle body 110, work equipment 120, and a control device 140.

The vehicle body 110 includes a front vehicle body 111, a rear vehicle body 112, and a steering actuator 113. The front vehicle body 111 and the rear vehicle body 112 are rotatably attached around a steering shaft extending in a vertical direction of the vehicle body 110. A pair of front wheels WF is provided at a lower portion of the front vehicle body 111. A pair of rear wheels WR is provided at a lower portion of the rear vehicle body 112.

The rear vehicle body 112 includes a power source 1121 and a power transmission device 1122. The power source 1121 is, for example, a diesel engine. The power transmission device 1122 shifts a speed of a driving force input to an input shaft, and outputs the speed from the output shaft. The output shaft of the power transmission device 1122 is connected to the front wheel WF via a front axle (not shown) and is connected to the rear wheel WR via a rear axle (not shown). The front axle supports the front vehicle body 111 to be able to travel. The rear axle supports the rear vehicle body 112 so as to be able to travel. The front axle and the rear axle are provided with braking devices (not shown). The power transmission device 1122 is provided with a rotation sensor 1123. The rotation sensor 1123 measures a rotation speed of the output shaft of the power transmission device 1122. The control device 140 can specify the speed and the acceleration of the work vehicle 100 based on measurement data of the rotation sensor 1123. Further, a detection device 1124 and a positioning device 1125 are provided on the upper portion of the rear vehicle body 112. The detection device 1124 detects a three-dimensional position of an object present around the work vehicle 100. A Light Detection and Ranging (LiDar), a stereo camera, an ultra wide band (UWB) distance measuring device, and the like are exemplary examples of the detection device 1124. The detection device 1124 is provided, for example, such that a detection direction faces the front. The positioning device 1125 measures a position and a posture (posture angle) of the work vehicle 100 in global coordinates by a Global Navigation Satellite System (GNSS) or the like. The position is represented by, for example, latitude and longitude. The posture is represented by, for example, an azimuth angle of the rear vehicle body 112 with the north as a reference azimuth. Hereinafter, the position and posture of the work vehicle 100 will also be referred to as a pose of the work vehicle 100.

The steering actuator 113 is, for example, a hydraulic cylinder. A proximal end portion of the steering actuator 113 is attached to the rear vehicle body 112, and a distal end portion thereof is attached to the front vehicle body 111. The steering actuator 113 expands and contracts by hydraulic oil to define an angle formed between the front vehicle body 111 and the rear vehicle body 112. That is, the expansion and contraction of the steering actuator 113 defines the steering angle of the front wheels WF. The steering actuator 113 is provided with a stroke sensor 1131 that measures a stroke length of the steering actuator 113. The control device 140 can specify the steering angle of the work vehicle 100 based on the measurement data of the stroke sensor 1131.

The power transmission device 1122, the braking device, and the steering actuator 113 are traveling devices for causing the vehicle body 110 to travel.

The work equipment 120 is used for excavating and transporting a work object such as earth. The work equipment 120 is provided in a front part of the vehicle body 110.

The control device 140 causes the work vehicle 100 to travel based on the detection data of the detection device 1124.

Configuration of Control Device 140

Figure 2:
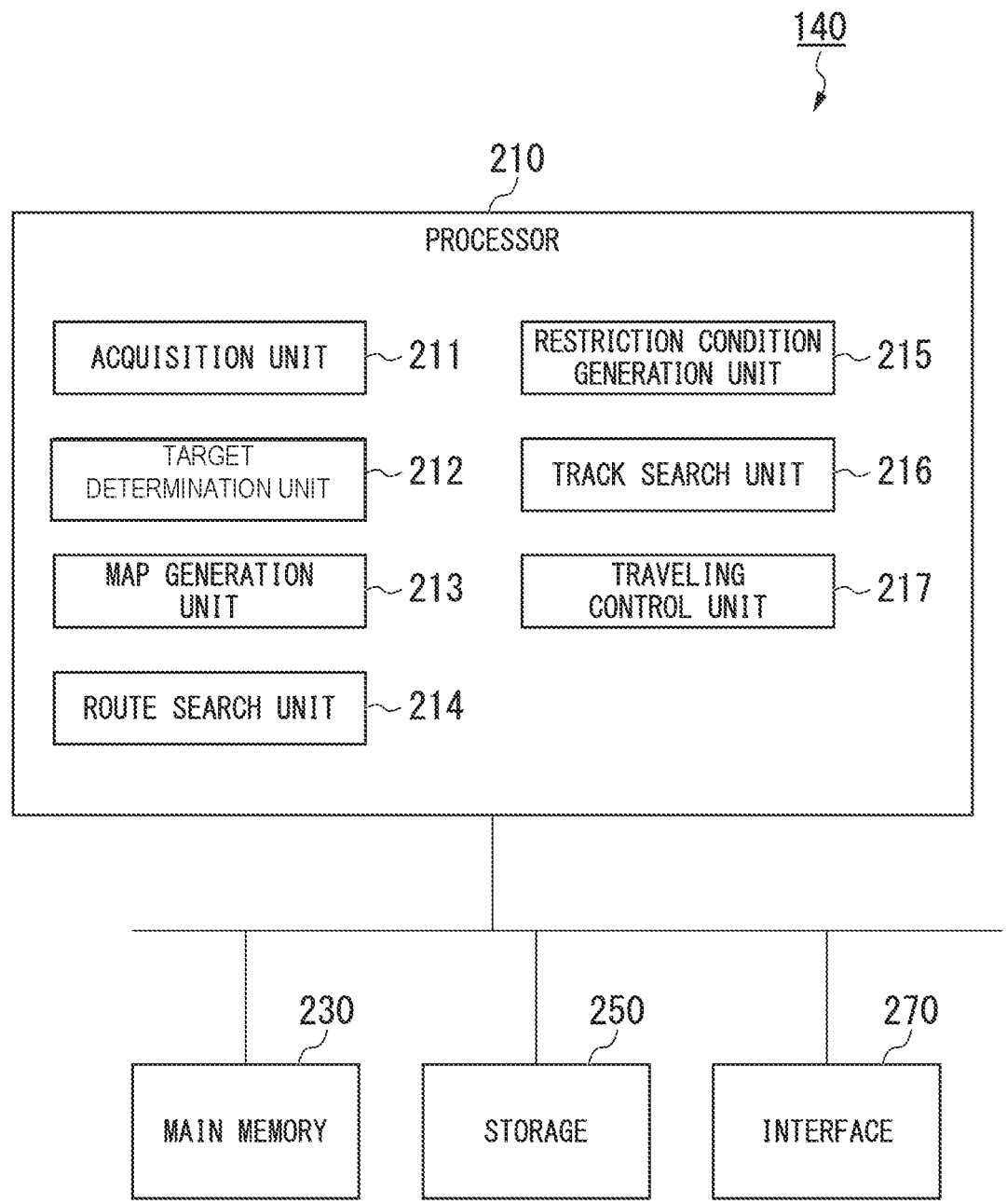
FIG. 2 is a schematic block diagram showing a configuration of a control device according to the first embodiment.

FIG. 2 is a schematic block diagram showing a configuration of the control device 140 according to the first embodiment.

The control device 140 is a computer including a processor 210, a main memory 230, a storage 250, and an interface 270.

The storage 250 is a non-transitory, tangible storage medium. A magnetic disk, an optical disk, a magneto-optical disk, a semiconductor memory, and the like are exemplary examples of the storage 250. The storage 250 may be an internal medium directly connected to the bus of the control device 140, or an external medium connected to the control device 140 via the interface 270 or a communication line. The storage 250 stores a program for controlling the work vehicle 100.

The program may be for realizing some of functions exerted by the control device 140. For example, the program may exert functions in combination with other programs already stored in the storage 250 or in combination with other programs mounted on other devices. In another embodiment, the control device 140 may include a custom Large Scale Integrated Circuit (LSI) such as a Programmable Logic Device (PLD) in addition to or in place of the above configuration. A Programmable Array Logic (PAL), a Generic Array Logic (GAL), a Complex Programmable Logic Device (CPLD), and a Field Programmable Gate Array (FPGA) are exemplary examples of the PLD. In this case, some or all of the functions realized by the processor may be realized by the integrated circuit.

Software Configuration

The processor 210 includes an acquisition unit 211, a map generation unit 213, a target determination unit 212, a route search unit 214, a restriction condition generation unit 215, a track search unit 216, and a traveling control unit 217 by executing a program. The control device 140 is an example of a track search device.

The acquisition unit 211 acquires the measurement data of the stroke sensor 1131, the rotation sensor 1123, the detection device 1124, and the positioning device 1125. Accordingly, the acquisition unit 211 specifies the position, the posture angle, the steering angle, the speed, and the acceleration of the work vehicle 100, and the position of an obstacle present around the work vehicle 100.

Figure 3:
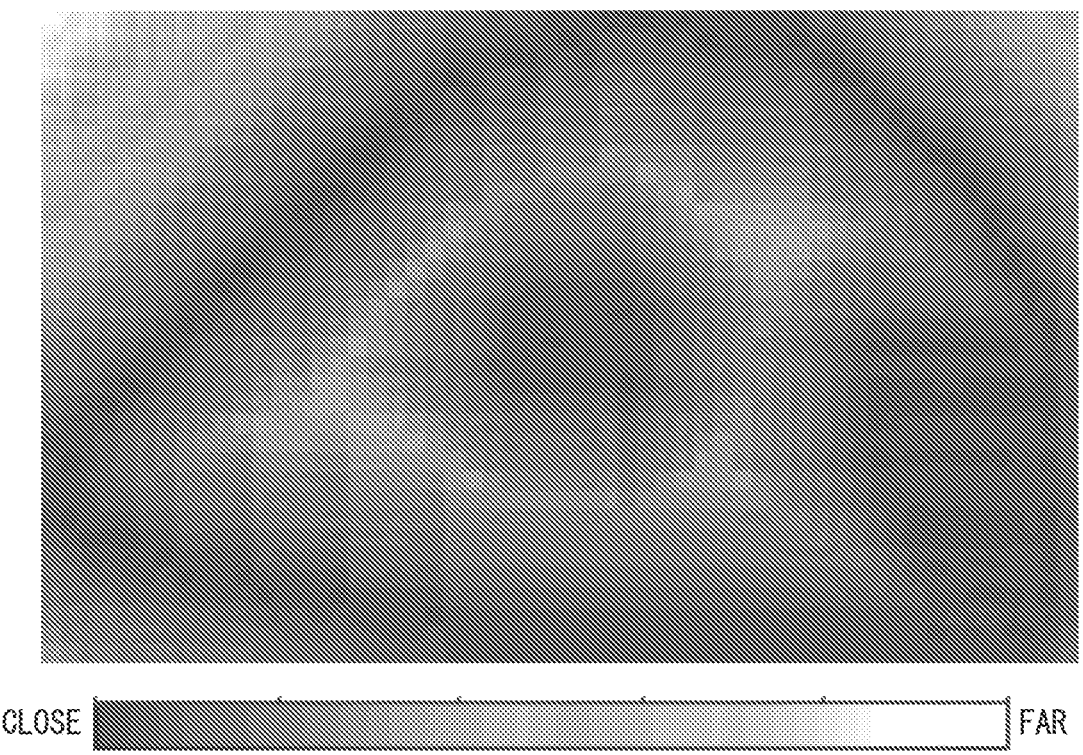
FIG. 3 is a diagram showing an example of map data according to the first embodiment.

The map generation unit 213 generates map data representing the periphery of the work vehicle 100 by using the measurement data of the detection device 1124 acquired by the acquisition unit 211, and the measurement data of the positioning device 1125. The map generation unit 213 generates map data by using, for example, Simultaneous Localization and Mapping (SLAM) technology. The map data is represented by, for example, an occupied grid map related to a global coordinate system. FIG. 3 is a diagram showing an example of the map data according to the first embodiment. Further, a score representing the distance from the obstacle is attached to each grid of the map data. A score of a grid representing a position where the obstacle exists is zero, and the farther the distance from the obstacle is, the higher the score. The score is represented by, for example, a Manhattan distance from the closest obstacle.

Since the detection device 1124 is fixed to the rear vehicle body 112, the map generation unit 213 moves the position of the obstacle indicated by the measurement data of the detection device 1124 in parallel based on the position indicated by the measurement data of the positioning device 1125, and the position of the obstacle in the global coordinate system can be specified by the rotation based on the posture angle. The map data generated by the map generation unit 213 is recorded in the main memory 230.

The target determination unit 212 determines a target pose (target position) of the work vehicle 100. For example, the target determination unit 212 determines a position of a loading site designated in advance and a posture angle facing the loading site to the target pose in a case where the earth is not held by the work equipment 120. Further, the target determination unit 212 determines a position of a release site designated in advance and a posture angle facing the release site as the target pose in a case where the earth is held by the work equipment 120. At this time, for example, the target determination unit 212 may correct the positions of the loading site and the release site based on the map data.

The route search unit 214 searches for a route connecting a current pose (initial position) of the work vehicle 100 acquired by the acquisition unit 211 to a target pose determined by a target determination unit 212. The "route" is represented by an ordinal set of poses. That is, the route obtained by the route search unit 214 is a series of the position and the posture angle of the work vehicle 100. The route search unit 214 searches for a route by using a complete search algorithm (first search algorithm) such as a dynamic planning method. The Dixstra method, the hybrid A*, and the like are exemplary examples of the algorithm related to the dynamic planning method. When the hybrid A* is used, a heuristic cost can be obtained by a Reeds Shepp method or a Laplace Potential method. The Reeds Shepp method is a method for finding a shortest route of a non-holonomic system when an obstacle or the continuity of curvature is ignored. The Laplace Potential method is a method for obtaining the shortest route when a non-holonomic restriction is ignored.

The restriction condition (first restriction condition) for the search by the route search unit 214 is that the map generation unit 213 does not contact the obstacle represented by the generated map data, that the pose at an end point matches the target pose, and the steering angle is within a predetermined movable range. The evaluation function of the search by the route search unit 214 is a function whose value decreases as the travel distance becomes shorter. The model used for the search by the route search unit 214 is represented by Equation (1).

$$\begin{bmatrix} x[k+1] \\ y[k+1] \\ z[k+1] \end{bmatrix} = \qquad (1)$$

$$\begin{bmatrix} x[k] + \frac{L}{\tan(\delta[k])} \left\{ \sin\left(\phi[k] + \frac{\Delta tv[k]\tan(\delta[k])}{L}\right) - \sin(\phi[k]) \right\} \\ y[k] + \frac{L}{\tan(\delta[k])} \left\{ -\cos\left(\phi[k] + \frac{\Delta tv[k]\tan(\delta[k])}{L}\right) + \cos(\phi[k]) \right\} \\ \phi[k] + \frac{\Delta tv[k]\tan(\delta[k])}{L} \end{bmatrix}$$

In Equation (1), x[k] indicates an x-coordinate (for example, latitude) at time k. y[k] indicates a y-coordinate (for example, longitude) at time k. φ[k] indicates a posture angle at time k. δ[k] indicates a steering angle at time k. v[k] indicates a speed at time k. k+1 represents a time after a unit time of time k. Δt indicates a time step width. L indicates a length from an articulate center to the front wheel WF. That is, a mathematical model used by the route search unit 214 is a model of three elements of the x-coordinate, y-coordinate, and posture angle of the work vehicle 100, and does not include the steering angle and speed as elements.

While the search algorithm related to the dynamic planning method has completeness, the amount of calculation increases exponentially with respect to the number of dimensions of a model or an input. Therefore, the route search unit 214 according to the first embodiment can reduce the amount of calculation by reducing the number of elements of the model.

In addition, in Equation (1), L/tan(δ[k]) represents a turning radius of the work vehicle 100. That is, in Equation (1), an increment in the x-coordinate is represented as a value obtained by multiplying a difference between a sine of a posture angle φ[k] and a sine of a posture angle φ[k+1] by a turning radius of the work vehicle 100 at time k. Similarly, in Equation (1), an increment in a y-coordinate is represented as a value obtained by multiplying a difference between a cosine of the posture angle φ[k] and a cosine of a posture angle φ[k+1] by the turning radius of the work vehicle 100 at time k.

The route search unit 214 acquires a series of poses of the work vehicle 100 as a route by performing a search based on the model represented by Equation (1). Although the model represented by Equation (1) uses time as an index, the index of the route is not treated as representing time in the restriction condition generation unit 215. For example, the pose x[i] in the route does not indicate the pose at time i, but simply indicates the i-th pose. Meanwhile, time series of the steering angle and the speed obtained by the route search unit 214 are used as initial values of the track search unit 216 which will be described later. It should be noted that, since the model used by the route search unit 214 is a pose model and does not include the steering angle and the speed as elements, the series of the searched steering angles and accelerations lacks continuity. That is, the route searched for by the route search unit 214 may have a discontinuous curvature or may include unnecessary switchback.

The restriction condition generation unit 215 generates a restriction condition (second restriction condition) to be used for the search by the track search unit 216 based on the route obtained by the route search unit 214. The restriction condition used for the search by the track search unit 216 is that the position of the work vehicle 100 is located within the allowable range series including the route obtained by the route search unit 214. The restriction condition is represented by a penalty function in which a penalty value increases according to a deviation distance from the allowable range series, and a penalty value when the work vehicle 100 is positioned within the allowable range series is zero.

Figure 4:
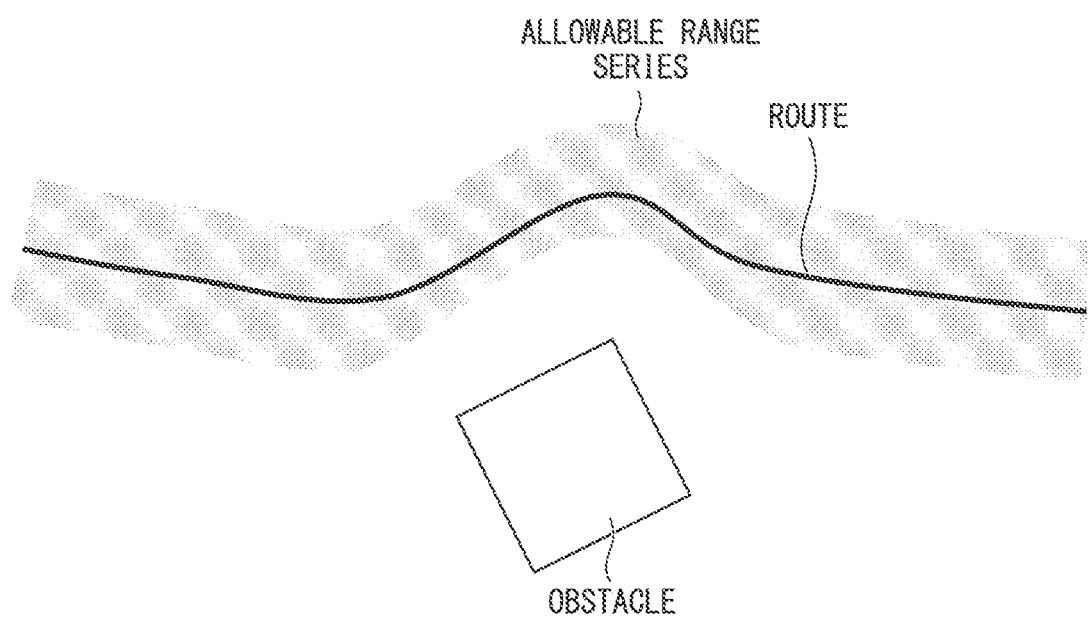
FIG. 4 is a diagram showing an example of an allowable range series according to the first embodiment.

FIG. 4 is a diagram showing an example of an allowable range series according to the first embodiment. The allowable range series is a series of allowable ranges represented by a rectangle. The allowable range is represented by the coordinates of four vertexes of the rectangle. The restriction condition generation unit 215 determines the allowable range series based on the map data generated by the map generation unit 213 and the route generated by the route search unit 214. As the route is converted into an allowable range series by the restriction condition generation unit 215, the discontinuity of the curvature of the route and unnecessary switchback can be ignored.

Figure 5:
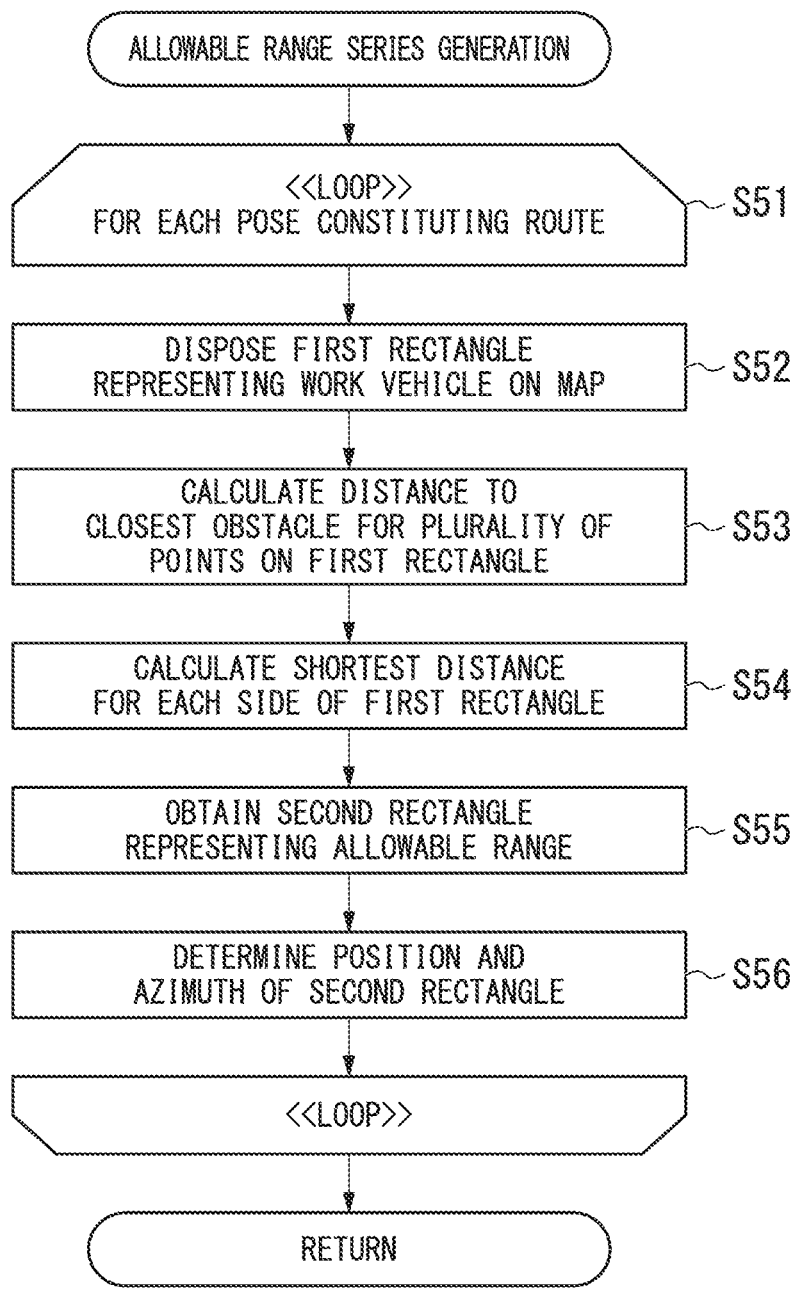
FIG. 5 is a flowchart showing a method of generating the allowable range series according to the first embodiment.

The restriction condition generation unit 215 generates an allowable range series by the following procedure. FIG. 5 is a flowchart showing the generation method of the allowable range series according to the first embodiment.

Figure 6:
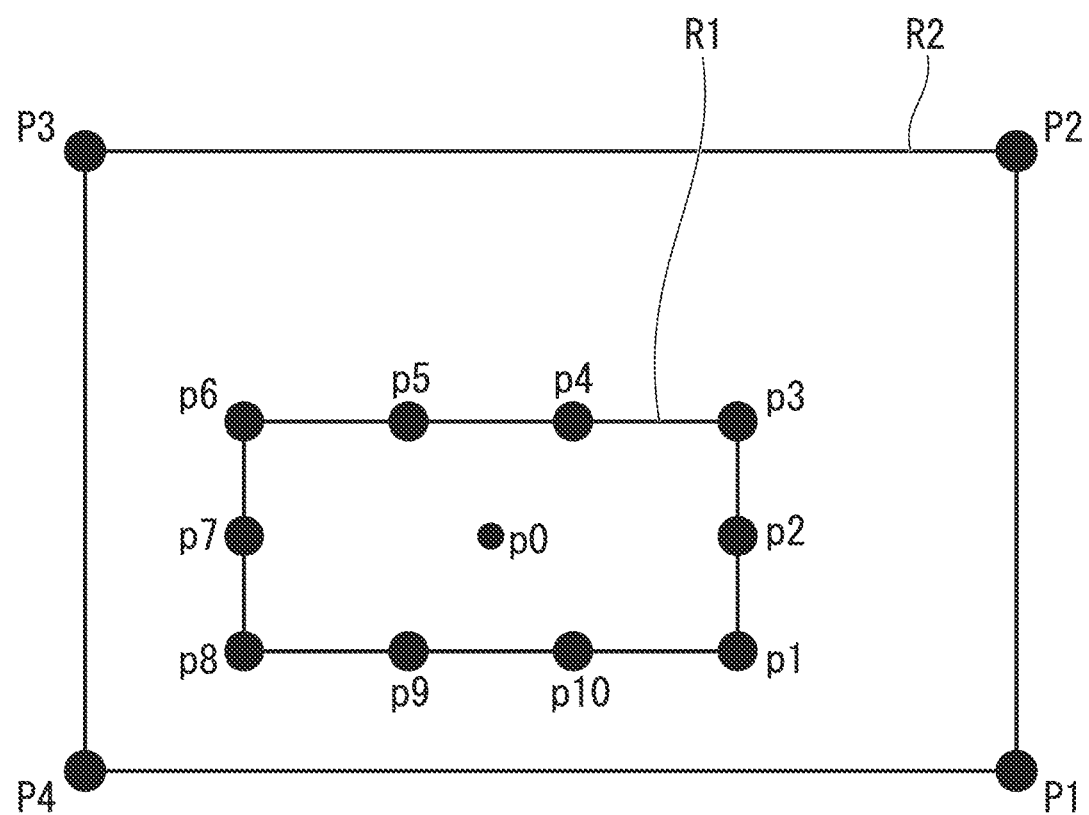
FIG. 6 is a diagram showing a relationship between a first rectangle and a second rectangle according to the first embodiment.

The restriction condition generation unit 215 selects a pose one by one from the series of poses related to the route (Step S51), and executes the following processes of Steps S52 to S56 for the selected poses. The restriction condition generation unit 215 disposes a first rectangle R1 representing an outer shape of the work vehicle 100 on the map data recorded in the main memory 230 based on the pose selected in Step S51 (Step S52). The restriction condition generation unit 215 calculates a distance (Euclidean distance) from each point to the closest obstacle based on the scores of a plurality of grids that overlap a plurality of points set on four sides of the first rectangle R1 in the map data (Step S53). FIG. 6 is a diagram showing a relationship between the first rectangle R1 and a second rectangle R2 according to the first embodiment. In a case where the first rectangle R1 includes two long sides E1 and E2 and two short sides E3 and E4, for example, four vertexes p1, p3, p6, and p8 of the first rectangle, two points p4 and p5 dividing the long side E1 into three, two points p9 and p10 dividing the long side E2 into three, a point p2 dividing the short side E3 into two, and a point p7 dividing the short side E4 into two are set. Since the score according to the first embodiment represents the Manhattan distance from the obstacle, a distance d to the obstacle can be obtained by the following Equation (2) using the score n.

$$d = \sqrt{\max\left(0, \frac{n-1}{2}\right)^2 + \max\left(0, \frac{n-3}{2}\right)^2} \quad (n: \text{even}) \quad (2)$$

$$d = \max\left(0, \frac{n-2}{2}\right)\sqrt{2} \quad (n: \text{odd})$$

Based on the map data, the restriction condition generation unit 215 specifies the shortest distance d among the distances d obtained in Step S53 for each of the four sides of the first rectangle (Step S54). The restriction condition generation unit 215 obtains the positions of the four vertexes P1, P2, P3, and P4 of the second rectangle R2 representing the allowable range by the following Equation (3) by using the distance d obtained in Step S54 (Step S55).

$$P1 = \begin{bmatrix} \min(d(p1), d(p2), d(p3)) \\ \min(d(p8), d(p9), d(p10), d(p11)) \end{bmatrix} \quad (3)$$

$$P2 = \begin{bmatrix} \min(d(p1), d(p2), d(p3)) \\ \min(d(p3), d(p4), d(p5), d(p6)) \end{bmatrix}$$

$$P3 = \begin{bmatrix} \min(d(p6), d(p7), d(p8)) \\ \min(d(p38), d(p4), d(p5), d(p6)) \end{bmatrix}$$

$$P4 = \begin{bmatrix} \min(d(p6), d(p7), d(p8)) \\ \min(d(p8), d(p9), d(p10), d(p11)) \end{bmatrix}$$

That is, the allowable range is represented by a second rectangle R2 that includes a center point p0 of a first rectangle R1 representing the work vehicle 100.

The restriction condition generation unit 215 determines a position and azimuth angle of the allowable range in the global coordinate system by arranging the rectangle of the allowable range calculated based on the pose selected in Step S51 (Step S56).

The restriction condition generation unit 215 can obtain the allowable range series by executing the above-described processing from Step S52 to Step S56 for all the poses of the route.

The track search unit 216 shown in FIG. 2 searches for a track connecting the current pose of the work vehicle 100 acquired by the acquisition unit 211 to the target pose determined by the target determination unit 212. The "track" is represented by a series of poses with time as a parameter. That is, the track search unit 216 obtains the pose for each time of the work vehicle 100, and a series of steering angles and speeds for realizing the pose for each time, as the track. The track search unit 216 searches for a track by a search algorithm (second search algorithm) that uses a quadratic approximation of the evaluation function. A differential dynamic planning method, an iterative linear quadratic regulator (iLQR), a sequential quadratic programming (SQP), and the like are exemplary examples of the search algorithm that uses the quadratic approximation of the evaluation function.

The search by the track search unit 216 is performed such that an evaluation value obtained by the sum of the evaluation function whose value decreases as the traveling time becomes shorter and the penalty function generated by the restriction condition generation unit 215 is minimized. In the search by the track search unit 216, the time step width Δt represented by Equation (1) is also an optimization target.

In the search algorithm using the quadratic approximation of the evaluation function, an increase in the amount of calculation with respect to the number of dimensions is gradual as compared with a search algorithm related to the dynamic planning method. Therefore, even when the steering angle, the speed, and the time step width are added to the optimization targets, the calculation amount does not explode. Meanwhile, the search algorithm that uses the quadratic approximation of the evaluation function does not have completeness, such as when the nonlinearity of a restriction conditions is strong, it may converge to a local solution. Therefore, by using the restriction condition that can be represented by a linear function generated by the restriction condition generation unit 215, it is possible to simplify the problem and prevent convergence to a local solution.

The traveling control unit 217 controls the steering actuator 113, the power source 1121, the power transmission device 1122, and the braking device according to the track obtained by the track search unit 216. That is, the traveling control unit 217 reads out a steering angle and a speed related to a current time from a series related to the track, controls the steering actuator 113 to realize the steering angle, and controls the power source 1121, the power transmission device 1122 and the braking device to realize the speed.

Operation of Control Device 140

Figure 7:
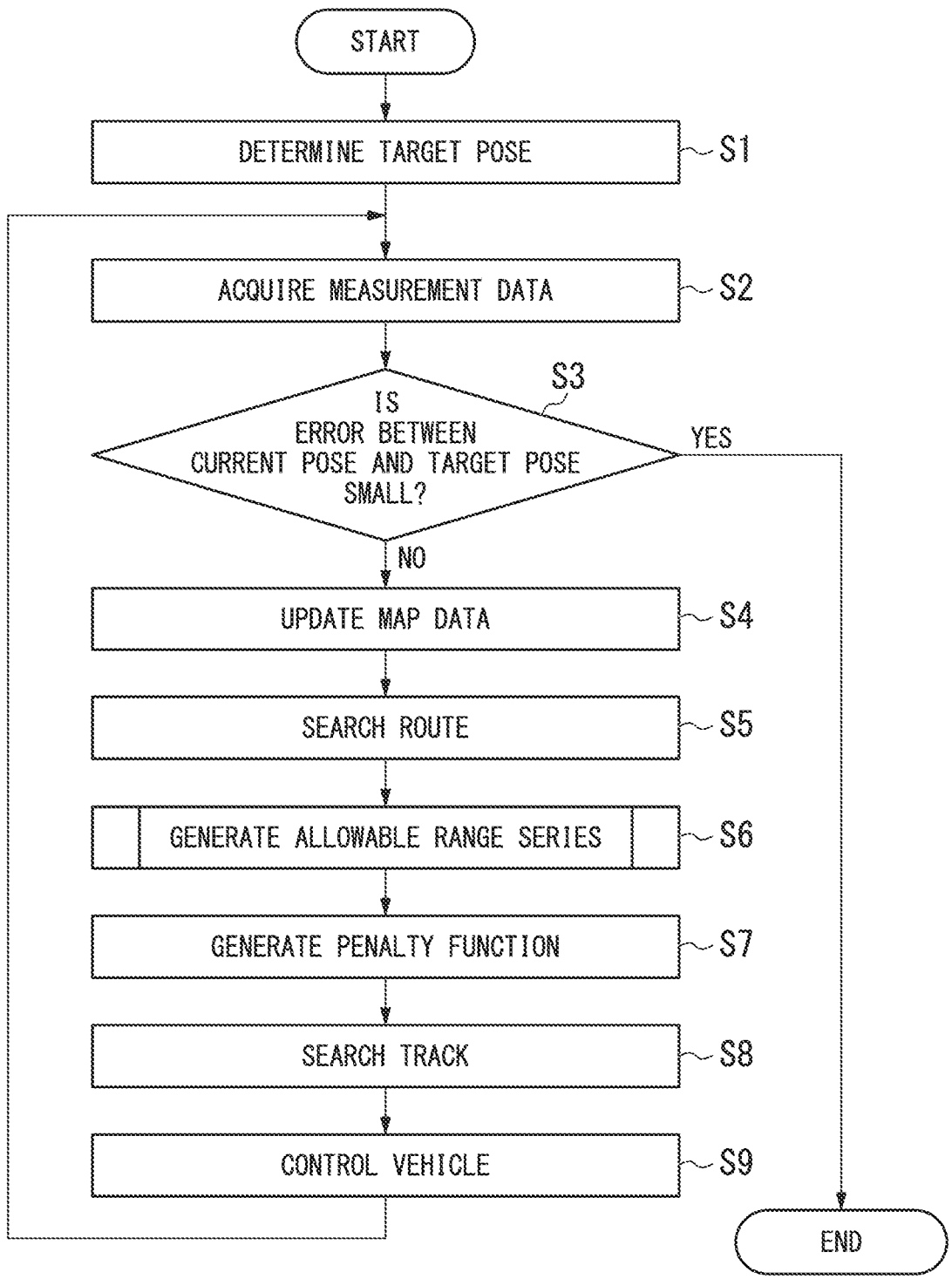
FIG. 7 is a flowchart showing an automatic traveling process of the control device according to the first embodiment.

FIG. 7 is a flowchart showing an automatic traveling process of the control device 140 according to the first embodiment.

The target determination unit 212 of the control device 140 determines a target pose based on the state of the work vehicle 100 (Step S1). The acquisition unit 211 acquires the measurement data of the stroke sensor 1131, the rotation sensor 1123, the detection device 1124, and the positioning device 1125 (Step S2). Based on the measurement data of the positioning device 1125 acquired in Step S2, the traveling control unit 217 determines whether an error between the target pose determined in Step S1 and the current pose is equal to or less than a predetermined threshold value (Step S3).

In a case where the error from the target pose is greater than the threshold value (Step S3: NO), the map data recorded in the main memory 230 is updated based on the measurement data of the detection device 1124 acquired in Step S2 (Step S4). The route search unit 214 searches for a route connecting the current pose of the work vehicle 100 to the target pose determined in Step S1 (Step S5).

Next, the restriction condition generation unit 215 executes the allowable range series generation process shown in FIG. 5 based on the route searched in Step S5 (Step S6). The restriction condition generation unit 215 generates a penalty function based on the generated allowable range series (Step S7). The track search unit 216 searches for a track connecting the current pose of the work vehicle 100 to the target pose by using the penalty function generated in Step S7 (Step S8). At this time, the track search unit 216 uses a series of the pose, steering angle, and speed obtained in the route search in Step S5 as an initial value of the search.

The traveling control unit 217 controls the steering actuator 113, the power source 1121, the power transmission device 1122, and the braking device according to the track obtained in Step S8 (Step S9). Then, the control device 140 returns the process to Step S2.

In Step S3, when an error from the target pose is greater than a threshold value (Step S3: NO), the control device 140 terminates the automatic traveling process. After the automatic excavation process and the automatic release process are executed, the control device 140 performs the automatic traveling process again.

Action/Effect

The control device 140 according to the first embodiment searches for the route for the work vehicle 100 to move from the initial position to the target position, based on the first restriction condition representing the position of the obstacle, and searches for the track, based on the second restriction condition (penalty function) in which the penalty value increases according to the deviation distance from the route. In this way, the control device 140 searches for the track in two stages with different restriction conditions. By setting the restriction conditions used for the track search to the restriction conditions according to the deviation distance from the route, it is possible to weaken the nonlinearity of the restriction conditions related to the track search and suppress an increase in the amount of calculation. That is, the control device 140 can obtain a continuous track with a small amount of calculation.

In addition, the control device 140 according to the first embodiment searches for the route by using a search algorithm having completeness, and searches for the track by using the second search algorithm in which the amount of calculation with respect to the number of elements gradually increases. As a result, the control device 140 can obtain the route and the track without converging to a local solution while reducing the amount of calculation.

In addition, the penalty function used to search for the track according to the first embodiment is the function in which the penalty value increases according to the deviation distance from the second rectangle that includes each position related to the route and extends in the width direction of the work vehicle 100, and thus, the penalty value is constant when the work vehicle 100 is positioned in the second rectangle. In this way, the control device 140 can obtain a highly linear penalty function.

Further, in the first embodiment, the search for the route and the track is performed using the model represented by Equation (1). In the model represented by Equation (1), the position (x[k+1], y[k+1]) of the work vehicle 100 after a unit time is represented based on the current position (x[k], y[k+1]) of the work vehicle 100, the turning radius obtained from the steering angle δ[k] of the work vehicle 100, the current posture angle φ[k] of the work vehicle 100, and the posture angle Φ[k+1] after a unit time of the work vehicle 100.

Figure 8:
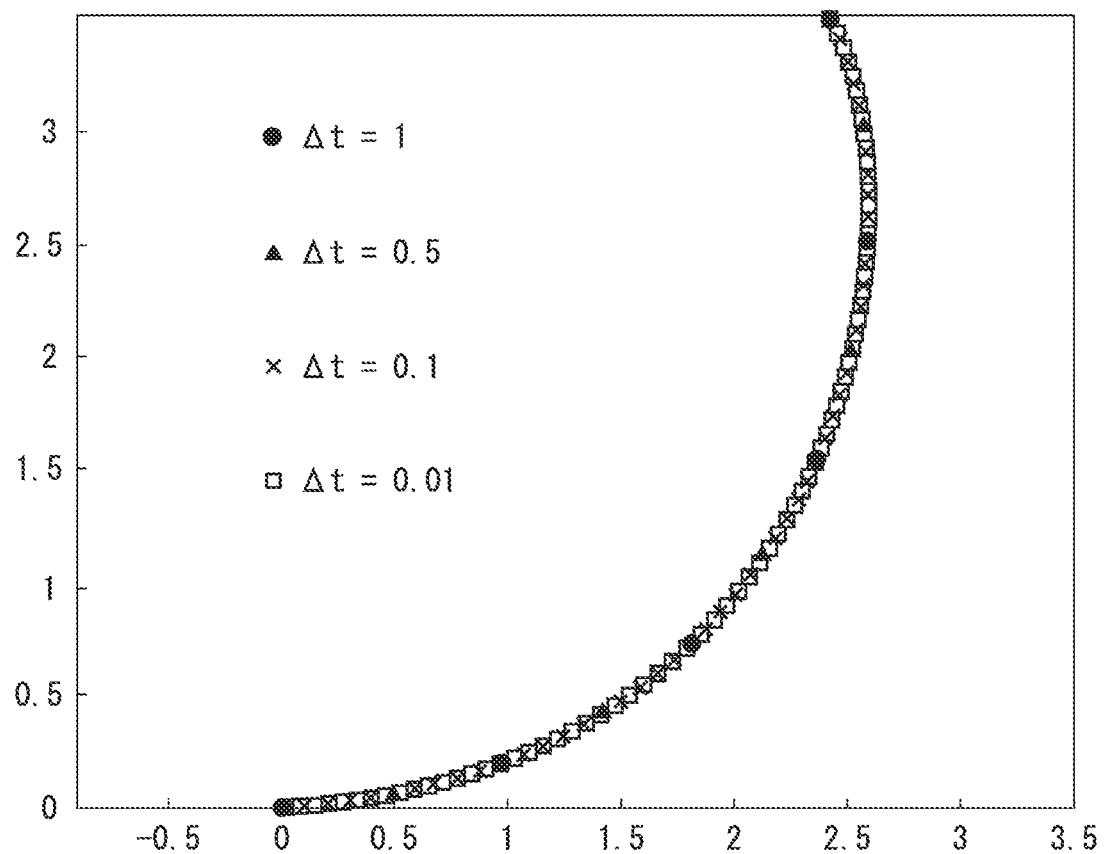
FIG. 8 is a diagram showing a relationship between a time step width and a position of a calculation result in a model according to the first embodiment.
Figure 9:
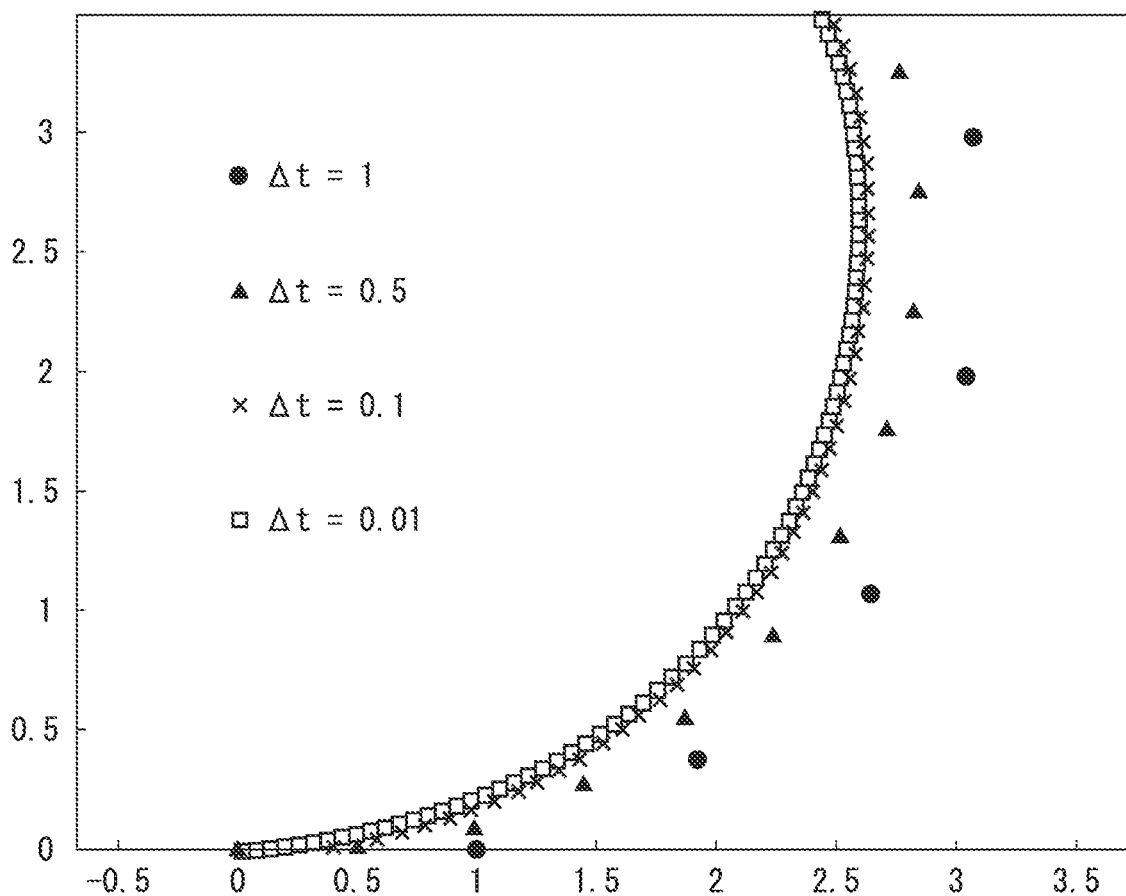
FIG. 9 is a diagram showing a relationship between a time step width and a position of a calculation result in a model according to a comparative example.

FIG. 8 is a diagram showing a relationship between the time step width and the position of the calculation result in the model according to the first embodiment. FIG. 9 is a diagram showing a relationship between the time step width and the position of the calculation result in the model according to a comparative example.

As the vehicle model, a vehicle model represented by the following Equation (4) may be used.

$$\begin{bmatrix} x[k+1] \\ y[k+1] \\ z[k+1] \end{bmatrix} = \begin{bmatrix} x[k] + \Delta t v[k]\cos(\phi[k]) \\ y[k] + \Delta t v[k]\sin(\phi[k]) \\ \phi[k] + \frac{\Delta t v[k]\tan(\delta[k])}{L} \end{bmatrix} \quad (4)$$

However, in the model represented by Equation (4), since the increment in the x-coordinate and the increment in the y-coordinate are close to linear movement, when a value of a time step width Δt changes, the position is calculated as shown in FIG. 9. There will be errors in the results. Meanwhile, in the model represented by Equation (1), since the increment in the x-coordinate and the increment in the y-coordinate are close to an arc by the turning radius and the posture angle, as shown in FIG. 8, even when the value of the time step width Δt changes, no error occurs in the calculation result of the position. Therefore, since the control device 140 according to the first embodiment can easily neglect the influence of the time step by using the model represented by Equation (1), it is possible to easily convert the route generated by the route search unit 214 to the track. As a result, the control device 140 can start the track search with the track at which the target state is reached as the initial value without coming into contact with the obstacle obtained by the route search unit 214. By setting a track that reaches the target state as an initial value, the route search unit 214 can calculate an appropriate track without converging to a local solution.

OTHER EMBODIMENTS

Although one embodiment has been described in detail above with reference to the drawings, the specific configuration is not limited to the one described above, and various design changes and the like can be made. That is, in other embodiments, the order of the processes described above may be changed as appropriate. Moreover, some processes may be executed in parallel.

The control device 140 according to the above-described embodiment may be configured by a single computer, or the configuration of the control device 140 may be arranged to be divided into a plurality of computers, and the plurality of computers may function as the control device 140 by cooperating with each other. In this case, some computers constituting the control device 140 may be mounted inside the work vehicle 100, and another computer may be provided outside the work vehicle 100.

Figure 10:
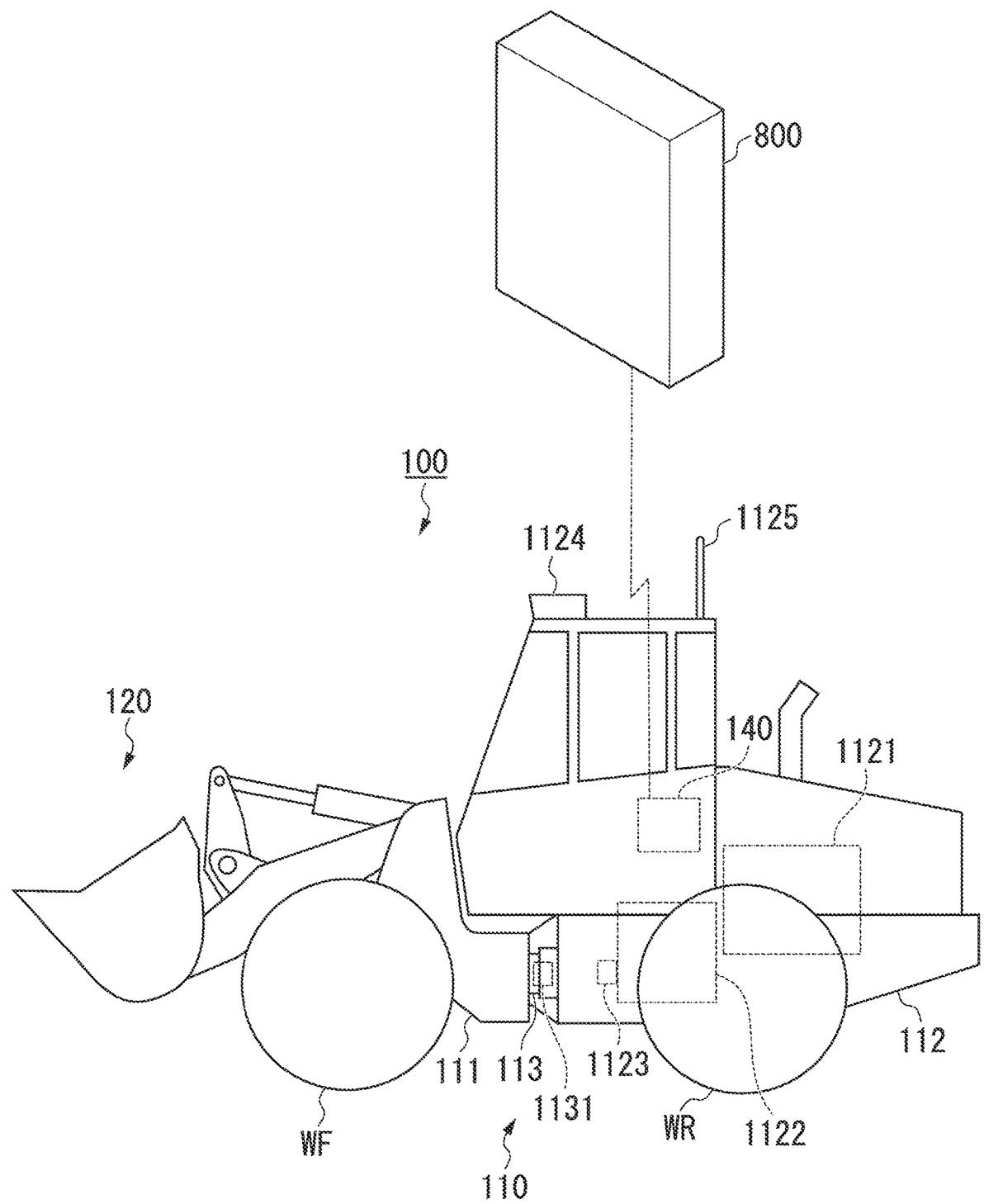
FIG. 10 is a schematic diagram showing a configuration of an automatic driving system according to another embodiment.

FIG. 10 is a schematic diagram showing a configuration of an automatic driving system 2 according to another embodiment. The work vehicle 100 according to the first embodiment autonomously travels under the control of a control device 140 provided therein. Meanwhile, in the automatic driving system 2 shown in FIG. 9, a control server 800 remotely provided with the work vehicle 100 controls the work vehicle 100. The control server 800 and the control device 140 are connected by wireless communication.

In this case, each processing unit shown in FIG. 2 is provided on the control server 800. The acquisition unit 211 acquires the measurement data of each measurement device by wireless communication. Further, the traveling control unit 217 transmits a control command to the control device 140 by wireless communication.

In addition, the control device 140 according to the first embodiment uses the dynamic planning method for searching for a route, but is not limited thereto. For example, in other embodiments, a route may be geometrically generated by a combination of curves such as a straight line, an arc, a Bezier curve, a clothoid curve, and a B-spline curve.

In addition, the control device 140 according to the first embodiment uses a search algorithm that uses a quadratic approximation of the evaluation function in the search for a track, but is not limited thereto. For example, in another embodiment, the control device 140 may obtain a track by re-formulation as a mathematical planning problem.

In addition, the control device 140 according to the first embodiment sets a movable range represented by the second rectangle as a restriction condition for the search for a track, but is not limited thereto. For example, the restriction condition according to another embodiment may be represented by a line segment that passes through a point related to the route and extends only in the width direction of the work vehicle 100.

In addition, the control device 140 according to the first embodiment obtains the second rectangle R2 based on Equation (3), but is not limited thereto. For example, the control device 140 according to another embodiment may obtain the second rectangle R2 by a procedure shown below. The control device 140 may obtain positions of four vertexes R1, R2, R3, and R4 of the second rectangle R2 by the following Equation (5) by using an azimuth angle α in the direction in which the obstacle closest to the work vehicle 100 exists and a distance d to the obstacle. In Equation (5), L indicates a length from the articulate center to the front wheel WF, and l represents a tread width.

$$P1 = \begin{bmatrix} \max\left(0, d - \frac{L}{2} - \frac{1}{2}\cos\alpha - \frac{1}{2}\right) \\ \max\left(0, d - \frac{l}{2} - \frac{1}{2}\sin\alpha - \frac{1}{2}\right) \end{bmatrix}$$ (5)

$$P2 = \begin{bmatrix} \max\left(0, d - \frac{L}{2} - \frac{1}{2}\cos\alpha - \frac{1}{2}\right) \\ \max\left(0, -\left(d - \frac{l}{2} - \frac{1}{2}\sin\alpha - \frac{1}{2}\right)\right) \end{bmatrix}$$

$$P3 = \begin{bmatrix} \max\left(0, -\left(d - \frac{L}{2} - \frac{1}{2}\cos\alpha - \frac{1}{2}\right)\right) \\ \max\left(0, d - \frac{l}{2} - \frac{1}{2}\sin\alpha - \frac{1}{2}\right) \end{bmatrix}$$

$$P4 = \begin{bmatrix} \max\left(0, -\left(d - \frac{L}{2} - \frac{1}{2}\cos\alpha - \frac{1}{2}\right)\right) \\ \max\left(0, -\left(d - \frac{l}{2} - \frac{1}{2}\sin\alpha - \frac{1}{2}\right)\right) \end{bmatrix}$$

In addition, the work vehicle 100 according to the first embodiment is a wheel loader that is an articulated vehicle, but is not limited thereto. For example, the vehicle according to another embodiment may be another vehicle such as a dump truck or may not be an articulated vehicle. In a case where the vehicle is not an articulated vehicle, for example, the steering angle is an angle between a steered wheel and the vehicle body. In addition, the work vehicle 100 according to another embodiment may be a crawler vehicle or a vehicle having wheels that cannot be turned, such as a skid steer loader. In this case, for example, the turning radius can be obtained from a speed difference between the left and right crawler belts or the wheels.

According to at least one of the above aspects, the track search device can obtain a continuous track with a small amount of calculation.

The invention claimed is:

1. A system that searches for a track for a vehicle to travel automatically, the system comprising:
    a processor including
        a route search unit configured to search for a series having elements of a position and posture of the vehicle, which is a route for moving from an initial position to a target position of the vehicle, based on a first restriction condition representing a position of an obstacle,
        a restriction condition generation unit configured to generate a second restriction condition in which a penalty value increases according to a deviation distance from the route, and
        a track search unit configured to search for a series having elements of a position, posture, speed, and steering angle of the vehicle, which is a track for moving from the initial position to the target position of the vehicle, based on the second restriction condition,
    the second restriction condition being a condition in which the penalty value increases according to a deviation distance from a region including a position related to each element of the route and extending in a width direction of the vehicle, and the penalty value is constant when the vehicle is positioned within the region.

2. The system according to claim 1, wherein
    the route search unit is configured to search for the route by using a first search algorithm having completeness, and
    the track search unit is configured to search for the track by using a second search algorithm in which an amount of calculation increases more slowly with respect to the number of elements than the first search algorithm.

3. The system according to claim 1, wherein
the restriction condition generation unit is configured to generate the second restriction condition based on the position of the obstacle, and the position and the posture related to each element of the route.

4. A work vehicle comprising:
a vehicle body;
a traveling device for causing the vehicle body to travel; and
the system according to claim 1,
the system further including a traveling control unit configured to control the traveling device according to the track.

5. A system that searches for a track for a vehicle to travel automatically, the system comprising:
a processor including
 a route search unit configured to search for a series having elements of a position and posture of the vehicle, which is a route for moving from an initial position to a target position of the vehicle, based on a first restriction condition representing a position of an obstacle,
 a restriction condition generation unit configured to generate a second restriction condition in which a penalty value increases according to a deviation distance from the route, and
 a track search unit configured to search for a series having elements of a position, posture, speed, and steering angle of the vehicle, which is a track for moving from the initial position to the target position of the vehicle, based on the second restriction condition,
the route search unit being configured to search for the route based on a model representing the vehicle, and
the model representing a position of the vehicle after a unit time based on a current position of the vehicle, a turning radius obtained from the steering angle of the vehicle, a current posture angle of the vehicle, and a posture angle of the vehicle after the unit time.

6. A method of searching for a track for a vehicle to travel automatically, the method comprising:
searching for a series having elements of a position and posture of the vehicle, which is a route for moving from an initial position to a target position of the vehicle, based on a first restriction condition representing a position of an obstacle;
generating a second restriction condition in which a penalty value increases according to a deviation distance from the route; and
searching for a series having elements of a position, posture, speed, and steering angle of the vehicle, which is a track for moving from the initial position to the target position of the vehicle, based on the second restriction condition
in searching for the route, the route being searched for based on a model representing the vehicle, and
the model representing a position of the vehicle after a unit time based on a current position of the vehicle, a turning radius obtained from the steering angle of the vehicle, a current posture angle of the vehicle, and a posture angle of the vehicle after the unit time.

7. The method according to claim 6, wherein
in searching for the route, the route is searched for by using a first search algorithm having completeness, and
in searching for the track, the track is searched for by using a second search algorithm in which an amount of calculation increases more slowly with respect to the number of elements than the first search algorithm.

8. The method according to claim 6, wherein
the second restriction condition is a condition in which the penalty value increases according to a deviation distance from a region including a position related to each element of the route and extending in a width direction of the vehicle, and the penalty value is constant when the vehicle is positioned within the region.

9. The method according to claim 8, wherein
in generating the second restriction condition, the second restriction condition is generated based on the position of the obstacle, and the position and the posture related to each element of the route.

* * * * *